(12) United States Patent
Hwang et al.

(10) Patent No.: US 10,880,073 B2
(45) Date of Patent: Dec. 29, 2020

(54) OPTIMIZING PERFORMANCE OF A BLOCKCHAIN

(71) Applicant: International Business Machines Corporation, Armonk, NY (US)

(72) Inventors: Dongming Hwang, Durham, NC (US); Barry Mosakowski, Raleigh, NC (US); Jianjun Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 16/058,612

(22) Filed: Aug. 8, 2018

(65) Prior Publication Data
US 2020/0052881 A1 Feb. 13, 2020

(51) Int. Cl.
*G06F 21/60* (2013.01)
*H04L 9/06* (2006.01)
*G06F 9/46* (2006.01)
*G06F 16/23* (2019.01)

(52) U.S. Cl.
CPC ............ *H04L 9/0637* (2013.01); *G06F 9/466* (2013.01); *G06F 16/2379* (2019.01); *G06F 21/602* (2013.01)

(58) Field of Classification Search
CPC ....... H04L 9/0637; H04L 63/10; H04L 63/00; H04L 2209/38; H04L 2209/26; H04L 9/3239; G06F 16/2379; G06F 9/466; G06F 21/602; G06F 9/4881; G06F 16/2365; G06F 21/64
USPC ....................................................... 707/703
See application file for complete search history.

(56) References Cited

U.S. PATENT DOCUMENTS

| | | | |
|---|---|---|---|
| 6,643,496 B1 | 11/2003 | Shimoyama et al. | |
| 7,072,344 B2 | 7/2006 | Abdelilah et al. | |
| 7,855,966 B2 | 12/2010 | Abdelilah et al. | |
| 8,085,733 B2 | 12/2011 | Roy et al. | |
| 9,674,064 B1* | 6/2017 | Thorson | G06F 9/4893 |
| 10,616,324 B1* | 4/2020 | Kaddoura | H04L 67/1076 |
| 2005/0111361 A1* | 5/2005 | Hosein | H04L 47/263 |
| | | | 370/230 |

(Continued)

FOREIGN PATENT DOCUMENTS

WO 2017145017 A1 8/2017

OTHER PUBLICATIONS

Arthur Gervais, Ghassan O. Karame, Karl Wüst, Vasileios Glykantzis, Hubert Ritzdorf, and Srdjan Capkun, "On the Security and Performance of Proof of Work Blockchains," CCS '16 Proceedings of the 2016 ACM SIGSAC Conference on Computer and Communications Security, pp. 3-16.

(Continued)

*Primary Examiner* — Hicham Skhoun

(57) ABSTRACT

An example operation may include one or more of monitoring, by an adaptive traffic engine, transactions data of a blockchain, detecting, by the adaptive traffic engine, a transaction commit event time out in a blockchain, determining, by the adaptive traffic engine, a processing queue of a the blockchain, measuring, by the adaptive traffic engine, a sending rate of the blockchain, and adjusting the sending rate, by the adaptive traffic engine, based on the transaction commit event time out, the processing queue and the sending rate to optimize performance of the blockchain.

20 Claims, 9 Drawing Sheets

(56) References Cited

U.S. PATENT DOCUMENTS

| | | | | |
|---|---|---|---|---|
| 2010/0142376 | A1* | 6/2010 | Lou | H04L 47/283 370/236 |
| 2013/0083654 | A1* | 4/2013 | Lee | H04L 43/08 370/230 |
| 2014/0003242 | A1* | 1/2014 | Nadas | H04L 47/32 370/235 |
| 2014/0193154 | A1* | 7/2014 | Graham | H04L 43/14 398/79 |
| 2017/0187641 | A1* | 6/2017 | Lundqvist | H04L 47/70 |
| 2017/0345011 | A1* | 11/2017 | Salami | G06Q 20/10 |
| 2018/0103042 | A1* | 4/2018 | Castagna | H04L 63/08 |
| 2018/0109541 | A1* | 4/2018 | Gleichauf | H04L 67/1097 |
| 2018/0268401 | A1* | 9/2018 | Ortiz | G06Q 20/36 |
| 2018/0276626 | A1* | 9/2018 | Laiben | G06Q 20/02 |
| 2018/0349202 | A1* | 12/2018 | Sharma | H04L 45/586 |
| 2019/0243572 | A1* | 8/2019 | Kursun | G06F 3/0632 |
| 2019/0305931 | A1* | 10/2019 | Borst | G06F 16/27 |
| 2019/0318424 | A1* | 10/2019 | McWilliams | G06Q 40/04 |

OTHER PUBLICATIONS

Geir Hovland, and Jan Kucera. "Nonlinear Feedback Control and Stability Analysis of a Proof-of-Work Blockchain," Journal of Modeling, Identification and Control, vol. 38, 1017, No. 4, pp. 157-168.

Jesse Yli-Huumo, Deokyoon Ko, Sujin Choi, Sooyong Park, and Kari Smolander, "Where Is Current Research on Blockchain Technology?—A Systematic Review," PloS one 11, No. 10 (2016): e0163477. Retrieved from Internet using: http://journals.plos.org/plosone/article?id=10.1371/journal.pone.0163477.

L. Puneeth Rao, K. Tirumaleswar Reddy, Judy and Priest, Saravanan Radhakrishnan, "Efficient Path Characteristics Orchestration for Blockchain Applications," IP.com Disclosure No. IPCOM000250842D.

Luciano García-Bañuelos, Alexander Ponomarev, Marlon Dumas, and Ingo Weber, "Optimized execution of business processes on blockchain," In International Conference on Business Process Management, pp. 130-146. Springer, Cham, 2017.

\* cited by examiner

US 10,880,073 B2

OPTIMIZING PERFORMANCE OF A BLOCKCHAIN

TECHNICAL FIELD

This application generally relates to blockchain technology, and more particularly, to testing and optimizing blockchain performance using an adaptive traffic generator.

BACKGROUND

In today's world, blockchains are used for wide variety of applications. A blockchain is a Cryptographic Distributed Ledger (CDL). A distributed ledger is ledger that is replicated in whole or in part to multiple computers. The CDL can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified).

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Due to a distributed nature of a blockchain, measuring performance of a blockchain network is difficult. Conventional blockchain networks do not provide any tools for automated determination of performance limits of a blockchain. Furthermore, conventional implementations have no means of adjusting and optimizing performance of the blockchain on the fly.

Accordingly, what is needed is an efficient automated method for measuring performance parameters of the blockchain and optimizing performance of the blockchain by adjusting its sending rate.

SUMMARY

This application is directed to method for testing and adjusting performance in blockchains. This application also provides a method for increasing or decreasing a sending rate in a blockchain based on measured parameters.

According to exemplary embodiments, the system and method provide for optimization of a performance of a blockchain to align with a service level agreement (SLA). The exemplary embodiments provide a traffic generation engine that can provide for the optimal performance of a blockchain. The performance of the blockchain may be measured in standard units such as TPS (transactions per second) that align with a blockchain networks SLA. For example, with a throughput of 100 TPS, a loss rate of 1% may occur. The traffic generation engine may achieve an optimal performance of the blockchain by adaptively adjusting sending rates based on measuring blockchain parameters such as system load status, history, queue depth, current sending rate, etc. The traffic generation engine may be configured to continually self-adjust the sending transaction rate based on the parameters of the blockchain.

One example embodiment may provide a method that includes one or more of the following steps: monitoring, by an adaptive traffic engine, transactions data of a blockchain, detecting, by the adaptive traffic engine, a transaction commit event time out in the blockchain, determining, by the adaptive traffic engine, a processing queue of the blockchain, measuring, by the adaptive traffic engine, a sending rate of the blockchain, and adjusting the sending rate, by the adaptive traffic engine, based on the transaction commit event time out, the processing queue and the sending rate to optimize performance of the blockchain.

Another example embodiment may provide a system that includes a processor and memory, wherein the processor is configured to perform one or more of monitor transactions data of a blockchain, detect a transaction commit event time out in the blockchain, determine a processing queue of the blockchain, measure a sending rate of the blockchain, and adjust the sending rate based on the transaction commit event time out, the processing queue and the sending rate to optimize performance of the blockchain.

A further example embodiment may provide a non-transitory computer readable medium comprising instructions, that when read by a processor, cause the processor to perform one or more of monitor transactions data of a blockchain, detect a transaction commit event time out in the blockchain, determine a processing queue of the blockchain, measure a sending rate of the blockchain, and adjust the sending rate based on the transaction commit event time out, the processing queue and the sending rate to optimize performance of the blockchain.

DETAILED DESCRIPTION

Figure 1:
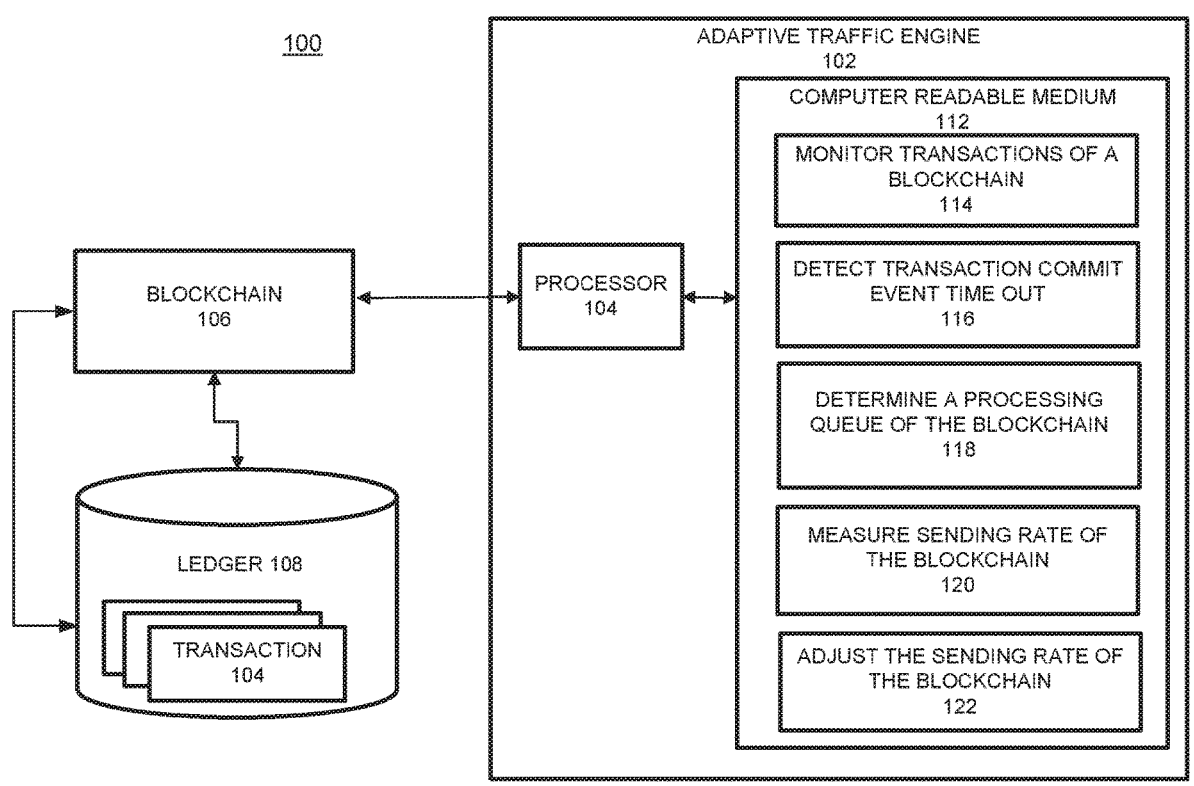
FIG. 1 illustrates a system diagram for testing and optimizing performance of a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide for testing and adjusting performance of a blockchain. The example embodiments also provide for a mechanism for increasing or decreasing the sending rate of the blockchain to align with the blockchain SLA.

The exemplary embodiments may use stored recorded transactions. A blockchain is a distributed system, which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions that are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node, which can receive client submitted transactions, commit the transactions and maintain a state and a copy of the ledger of blockchain transactions. Peers can also have the role of an endorser, although it is not a requirement. An ordering-service-node or an orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted. As discussed above, the exemplary embodiments may use recorded blockchain transactions stored on a blockchain ledger. A traffic generation engine may obtain the optimal performance of a blockchain. The performance of the blockchain may be measured in standard units such as TPS (transactions per second) that align with a blockchain networks SLA. For example, with a throughput of 100 TPS, a loss rate of 1% may occur. The traffic generation engine may achieve an optimal performance of the blockchain by adaptively adjust sending rates based on measuring blockchain parameters such as system load status, history, queue depth, current sending rate, etc. The traffic generation engine may be configured to continually self-adjust the sending transaction rate based on the state and history of the blockchain such as queue status and event timeout, etc. until the blockchain reaches a steady state with maximum TPS. According to one exemplary embodiment, the traffic engine may decrease the sending rate quickly to recover the blockchain network if the conditions of decreasing performance are detected (e.g., high latency, or transaction commit event timeout, etc). The traffic engine may increase the sending rate slowly if the conditions of increasing performance are detected, (e.g., queue depletion, absence of commit event timeout, sending rate being less than a processing rate). The traffic engine may adjust the sending rate based on the current and past state of the blockchain.

The example embodiments are directed to methods, devices, networks, non-transitory computer readable media and/or systems, which support a blockchain solution for optimization of performance of the blockchains. Some of the benefits of such a solution include enabling for measuring an optimal blockchain performance and for an automated increase or decrease of a current sending rate in order to align with a consortium SLA.

The blockchain ledger data is immutable and that provides traceability and provenance with regard transactions and performance of the blockchain. Also, use of the blockchain provides security and builds trust. The Smart Contract also manages the state of the asset to complete the life-cycle. The example blockchain is permission decentralized. Hence, each host device may have a ledger copy to access. Additionally, multiple Organizations (and peers) may be on-boarded on the blockchain network. The key Organizations may serve as endorsing peers to validate the smart contract execution results, read-set and write-set. The exemplary blockchain may be integrated with mobile applications or browser-based applications.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for optimization of performance of a blockchain is implemented due to immutable accountability, security, privacy, permitted decentralization, availability of Smart Contracts, endorsements and accessibility that are inherent and unique to blockchain. In particular, the blockchain ledger data is immutable and that provides for efficient measurement of performance parameters of the blockchain. Also, use of the encryption in blockchain provides security and builds trust. The Smart Contract manages the state of the asset to complete the life-cycle. The example blockchains is permission decentralized. Thus, each end user may have its own ledger copy to access. Multiple Organizations (and peers) may be on-boarded on the blockchain network. The key Organizations may serve as endorsing peers to validate the smart contract execution results, read-set and write-set. In other words, the blockchain inherent features provide for detection of event timeouts, queue status, etc. to adjust the blockchain sending rate until it reaches the steady state having the optimal TPS that the blockchain network can perform at.

One of the benefits of the example embodiments is an improvement of the functionality of a computing system by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a Business Network of users and on-board/off-board organizations to collaborate and execute service processes in the form of smart contracts.

Through the blockchain solution described herein, a computing system can perform novel functionality by providing an automated method for optimizing performance of the blockchain by adjusting the current sending rate to align with the blockchain SLA.

The example embodiments provide numerous benefits over a traditional database. For example, various advantages are achieved by immutable accountability, security, privacy, permitted decentralization, availability of smart contracts, endorsements and accessibility that are inherent and unique to blockchain.

Meanwhile, a traditional database could not be used to implement the example embodiments, because it does not bring all parties on the business network, it does not create trusted collaboration and does not provide for a transaction commit event time out detection. Thus, the proposed performance optimization cannot be implemented in the traditional database.

Meanwhile, if a traditional database were to be used to implement the example embodiments, the example embodiments would have suffered from unnecessary drawbacks such as search capability, lack of security and slow speed of transactions. Additionally, the automated method for blockchain performance optimization would simply not be possible.

Accordingly, the example embodiments provide for a specific solution to a problem in the arts/field of blockchain performance. In particular, the exemplary embodiments provide for an automated blockchain performance adjustment based on measured blockchain parameters.

FIG. 1 illustrates a system for testing and optimizing performance of a blockchain, according to example embodiments. Referring to FIG. 1, the example network 100 includes an adaptive traffic engine 102 connected to a blockchain 106, which has a blockchain ledger 108 for storing transactions 104. While this example shows only one adaptive traffic engine 102, multiple adaptive traffic engines may be connected to the blockchain 106. It should be understood that the adaptive traffic engine 102 may include additional components and that some of the components described herein may be removed and/or modified without departing from a scope of the adaptive traffic engine 102 disclosed herein. The adaptive traffic engine 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the adaptive traffic engine 102 may include multiple processors, multiple cores, or the like, without departing from a scope of the adaptive traffic engine 102 system.

The adaptive traffic engine 102 may also include a non-transitory computer readable medium 112 that may have stored thereon machine-readable instructions executable by the processor 104. Examples of the machine-readable instructions are shown as 114-122 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 114 to monitor transactions data 104 of a blockchain 106. The blockchain 106 may be managed by one or more devices and may be accessible by multiple end users on a decentralized network. The blockchain 106 may be configured to use one or more smart contracts that specify transactions among multiple users. The processor 104 may fetch, decode, and execute the machine-readable instructions 116 to detect a transaction commit event time out in the blockchain 106. The processor 104 may fetch, decode, and execute the machine-readable instructions 118 to determine a processing queue of the blockchain 106. The processor 104 may fetch, decode, and execute the machine-readable instructions 120 to measure a sending rate of the blockchain 106. The processor 104 may fetch, decode, and execute the machine-readable instructions 122 to adjust the sending rate of the blockchain 106 based on the transaction commit event time out, the processing queue and the sending rate of the blockchain to optimize performance of the blockchain. According to one exemplary embodiment, the adaptive traffic engine 102 may use a pre-set timestamp. The adaptive traffic engine 102 may increase or decrease the sending rate of the blockchain 106 and may adjust the timestamp based on the status of decrease or increase of the sending rate. Thus, both the sending rate and the timestamp maybe adjusted.

Figure 2A:
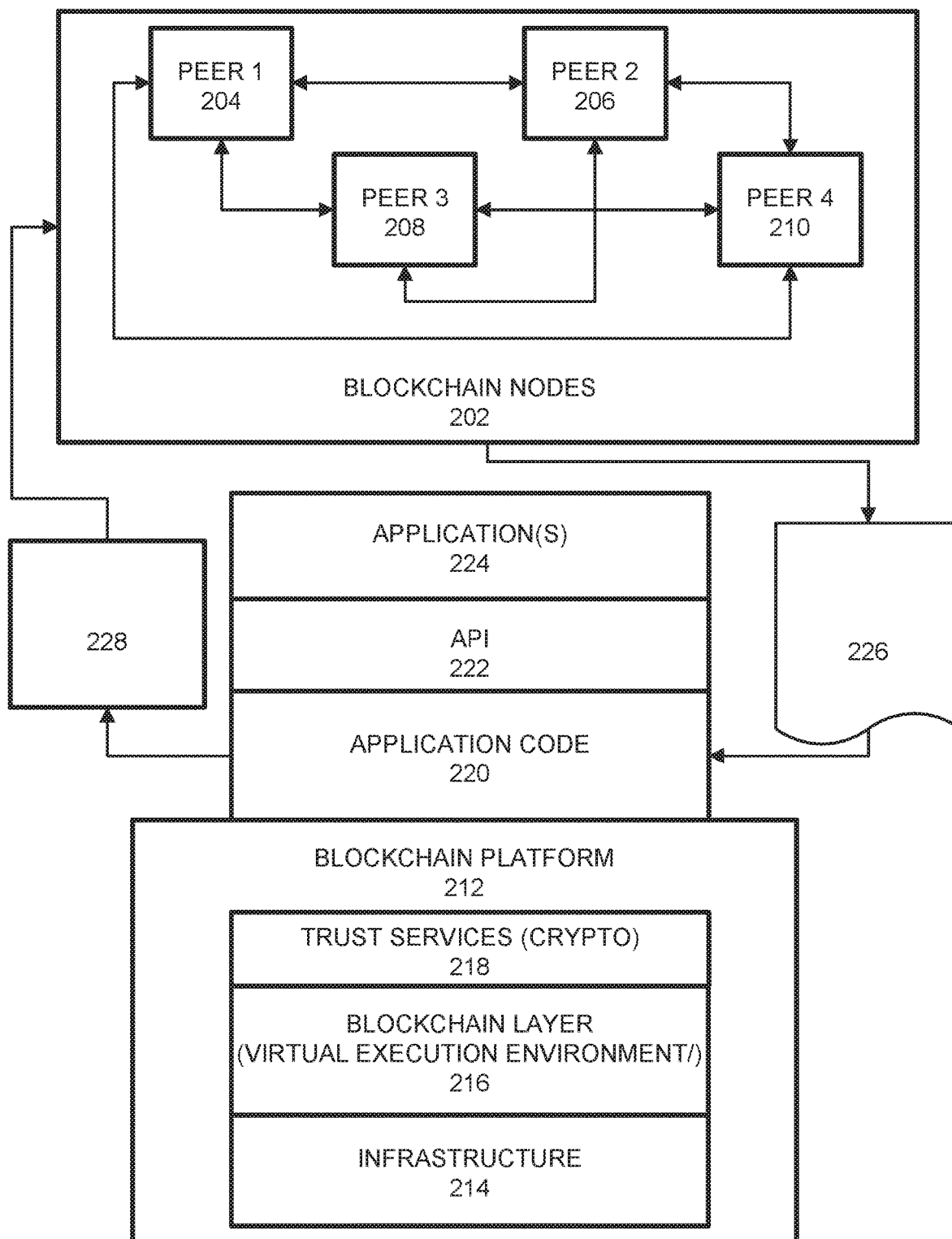
FIG. 2A illustrates an example peer node blockchain architecture configuration for testing and adjusting performance of the blockchain, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the sending rate adjustment instructions 226 may be processed by one or more processing entities (e.g., virtual machines) included in the blockchain layer 216. The adjusted sending rate of the blockchain result 228 may include decreasing or increasing of the sending rate based on monitored parameters. The physical infrastructure 214 may be utilized to retrieve any of the data or information described herein.

Within chaincode, a smart contract may be created via a high-level application and programming language, and then written to a block in the blockchain. The smart contract may include executable code, which is registered, stored, and/or replicated with a blockchain (e.g., distributed network of blockchain peers). A transaction is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The Smart Contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, monitoring of the performance of the blockchain may be implemented based on committed blockchain transaction and timed out transactions data. At box 226 the sending rate adjustment instructions may be provided. One function at box 228 may be to provide the adjusted sending rate of the blockchain, which may be provided to one or more of the nodes 204-210 that may host an adaptive traffic engine(s).

Figure 2B:
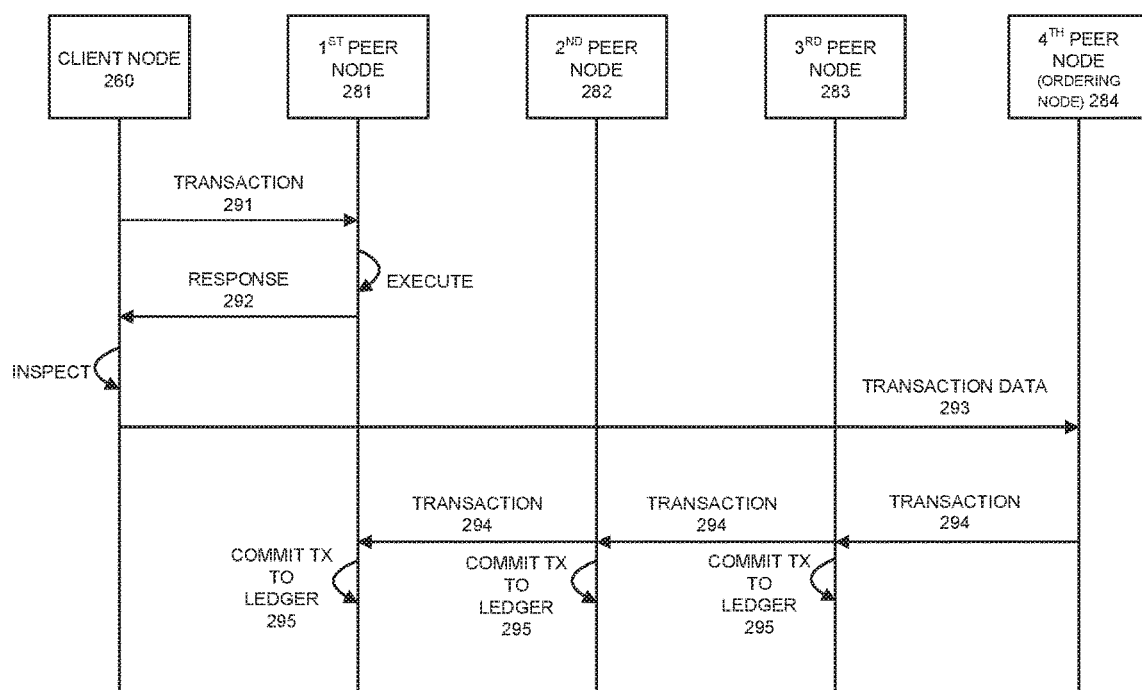
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260, which parses the payload for the application to consume.

In response, the application of the client 260 inspects/ verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
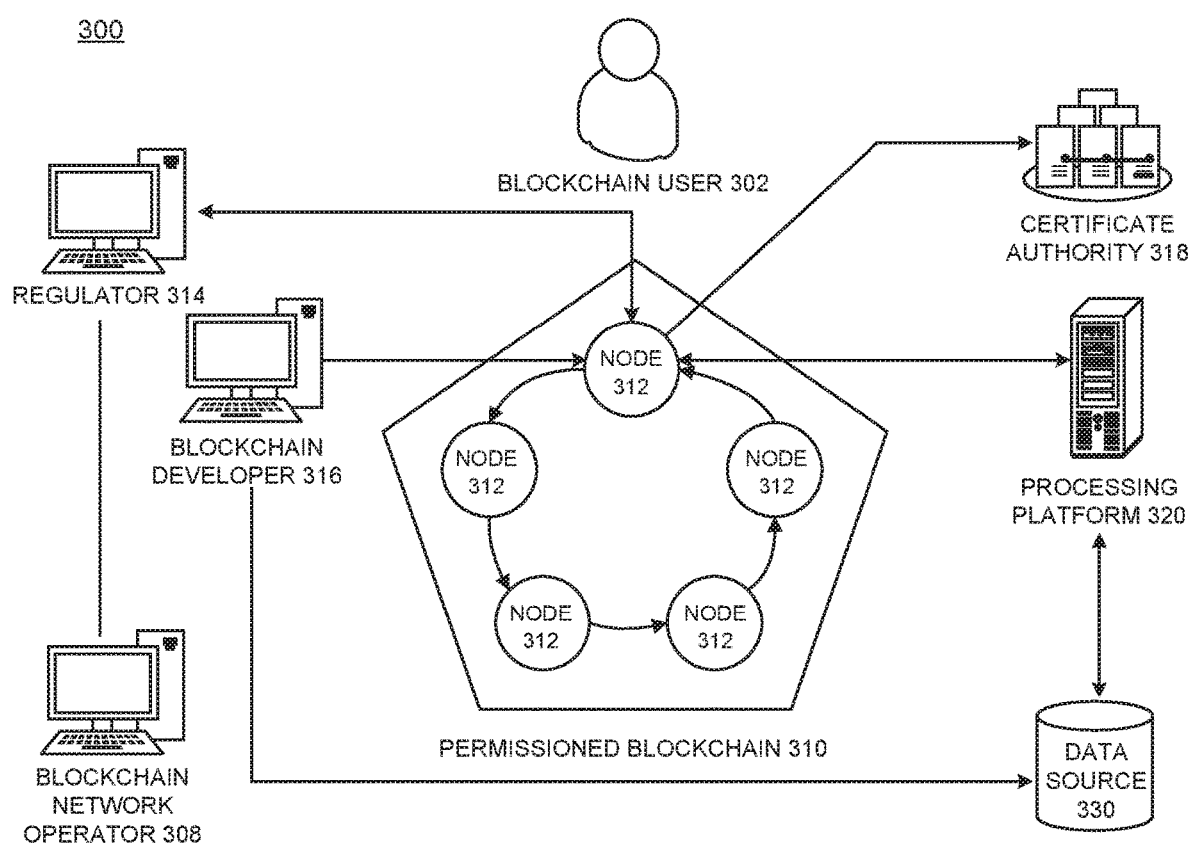
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
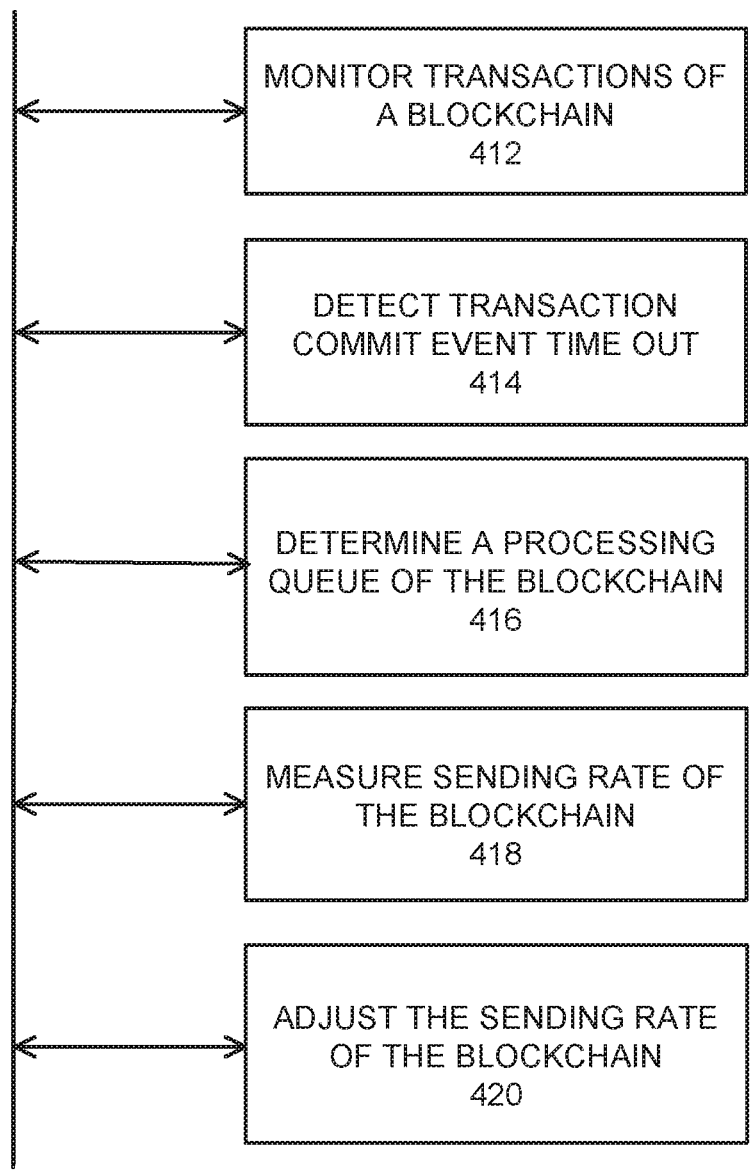
FIG. 4A illustrates a flow diagram of an example method of testing performance of a blockchain, according to example embodiments.

FIG. 4A illustrates a flow diagram 400 of an example method of testing performance of a blockchain, according to example embodiments. Referring to FIG. 4A, the method 400 may include one or more of the steps described below.

FIG. 4A illustrates a flow chart of an example method executed by the adaptive traffic engine 102 (see FIG. 1). It should be understood that method 400 depicted in FIG. 4A may include additional operations and that some of the operations described therein may be removed and/or modified without departing from the scope of the method 400. The description of the method 400 is also made with reference to the features depicted in FIG. 1 for purposes of illustration. Particularly, the processor 104 of the adaptive traffic engine 102 may execute some or all of the operations included in the method 400.

With reference to FIG. 4A, at block 412, the processor 104 may monitor transactions data 104 of a blockchain 106. At block 414, the processor 104 may detect a transaction commit event time out in the blockchain 106. At block 416, the processor 104 may determine a processing queue of the blockchain 106. At block 418, the processor 104 may measure a sending rate of the blockchain 106. Then, at block 420, the processor 104 may adjust the sending rate based on the transaction commit event time out, the processing queue and the sending rate to optimize performance of the blockchain. According to one exemplary embodiment, the processor 104 may decrease the sending rate of the blockchain if one of the following conditions occurs: the transaction commit event time out is detected, the processing queue excides a high threshold, a combination of the processing queue excides a pre-defined level of a queue depth and the sending rate exceeds a drain rate, or the sending rate exceeds a drain rate. According to another exemplary embodiment, the processor 104 may increase the sending rate of the blockchain if one of the following conditions occurs: the processing queue is below a pre-defined level of a queue depth while the transaction commit event time out is not detected, the processing queue is below a low threshold, or a combination of the processing queue being below a pre-defined level of a queue depth and the sending rate being below a drain rate. Thus, the method for 400 may adjust the sending rate of the blockchain 106.

Figure 4B:
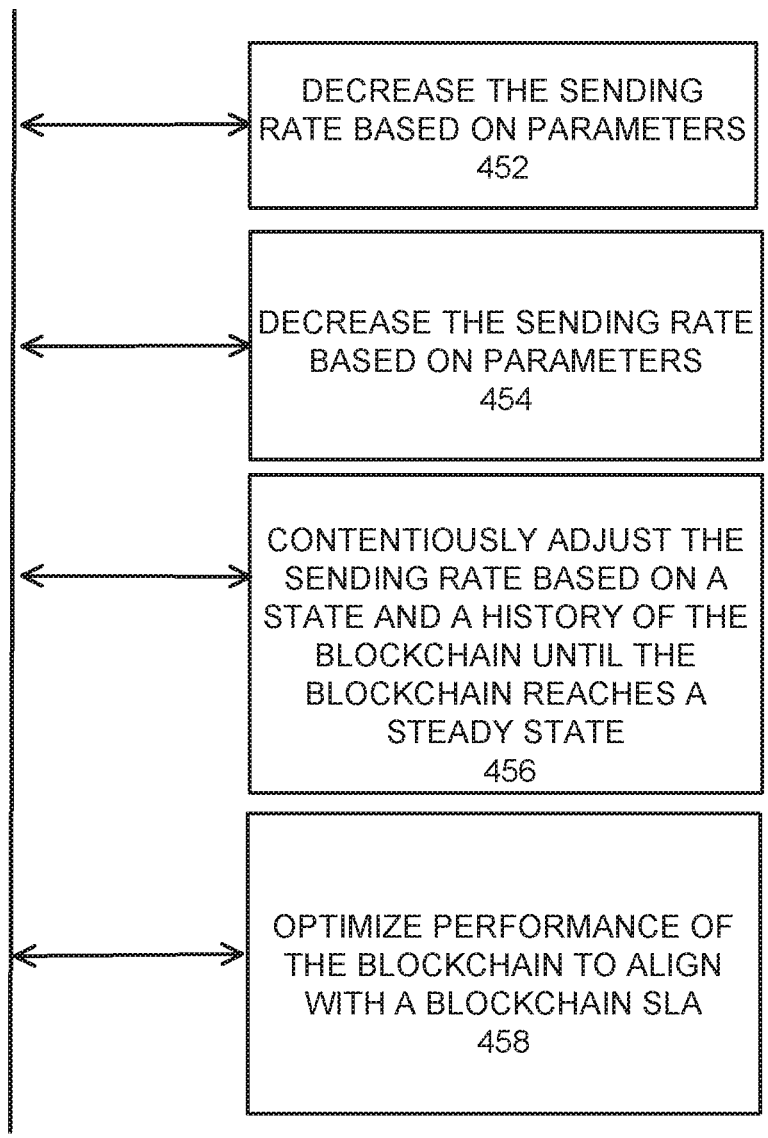
FIG. 4B illustrates a flow diagram of an example method of optimizing performance of a blockchain, according to example embodiments.

FIG. 4B illustrates a flow diagram 450 of an example method of optimizing performance of a blockchain, according to example embodiments. Referring to FIG. 4B, the method 450 may also include one or more of the following steps. At block 452, the processor 104 may decrease the sending rate of the block chain based on the parameters determined by the adaptive traffic engine 102. As discussed above, these parameters may be one of the transaction commit event time out is detected, the processing queue excides a high threshold, a combination of the processing queue excides a pre-defined level of a queue depth and the sending rate exceeds a drain rate, or the sending rate exceeds a drain rate. At block 454, the processor 104 may increase the sending rate of the block chain based on the parameters determined by the adaptive traffic engine 102. These parameters may be one of the processing queue is below a pre-defined level of a queue depth while the transaction commit event time out is not detected, the processing queue is below a low threshold, or a combination of the processing queue being below a pre-defined level of a queue depth and the sending rate being below a drain rate. At block 456, the processor 104 may continuously self-adjust the blockchain sending rate based on a state and a history of the blockchain until the blockchain reaches a steady state with a maximum number of transactions per second. At block 456, the processor 104 may optimize the performance of the blockchain to align with a blockchain service level agreement (SLA) 458.

Figure 5A:
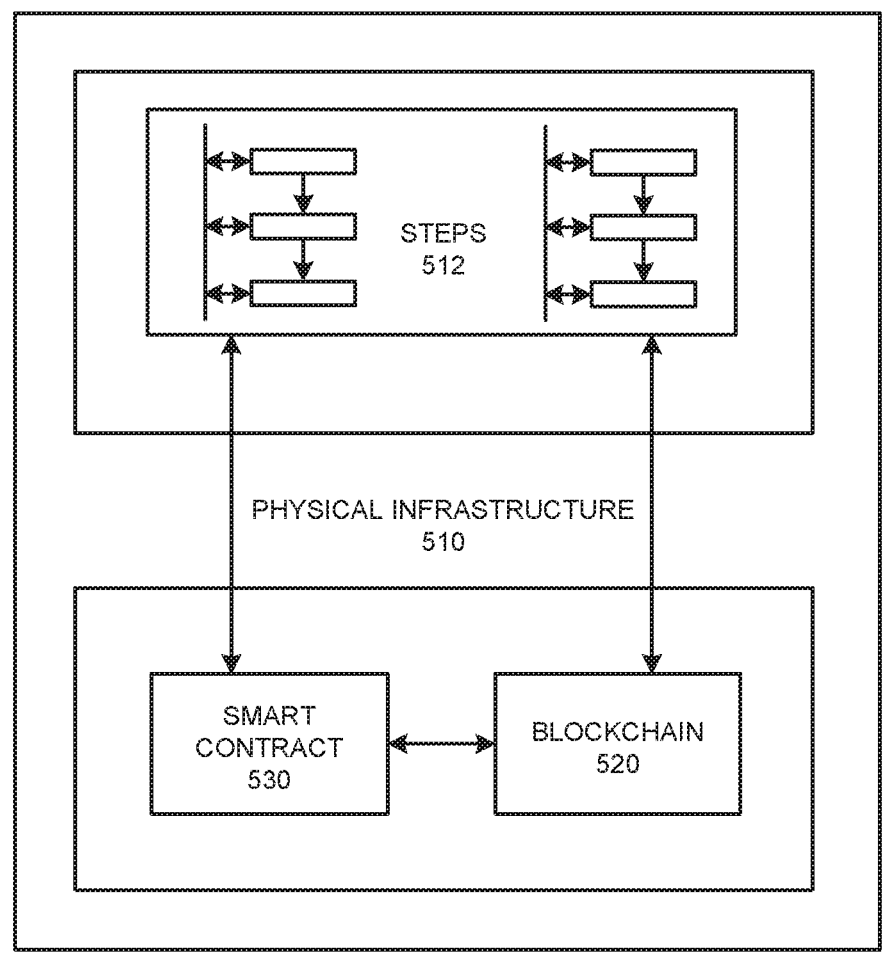
FIG. 5A illustrates an example physical infrastructure configured to perform various operations on the blockchain in accordance with one or more operations described herein, according to example embodiments.

FIG. 5A illustrates an example physical infrastructure configured to perform various operations on the blockchain in accordance with one or more of the example methods of operation according to example embodiments. Referring to FIG. 5A, the example configuration 500 includes a physical infrastructure 510 with a blockchain 520 and a smart contract 530, which may execute any of the operational steps 512 included in any of the example embodiments. The steps/operations 512 may include one or more of the steps described or depicted in one or more flow diagrams and/or logic diagrams. The steps may represent output or written information that is written or read from one or more smart contracts 530 and/or blockchains 520 that reside on the physical infrastructure 510 of a computer system configuration. The data can be output from an executed smart contract 530 and/or blockchain 520. The physical infrastructure 510 may include one or more computers, servers, processors, memories, and/or wireless communication devices.

Figure 5B:
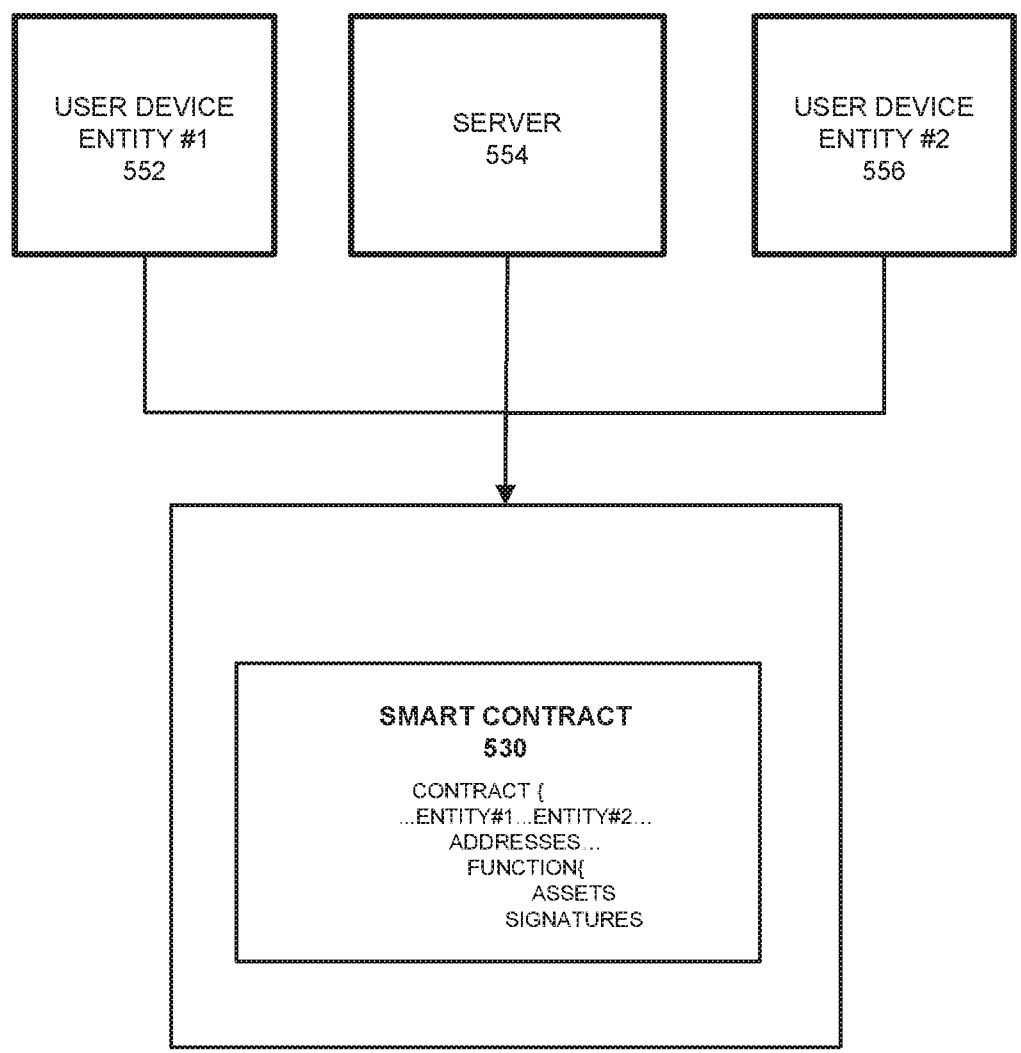
FIG. 5B illustrates an example smart contract configuration among contracting parties and a mediating server configured to enforce smart contract terms on a blockchain, according to example embodiments.

FIG. 5B illustrates an example smart contract configuration among contracting parties and a mediating server configured to enforce the smart contract terms on the blockchain according to example embodiments. Referring to FIG. 5B, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 630 may require digital signatures by one or more of the entities 552 and 556 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
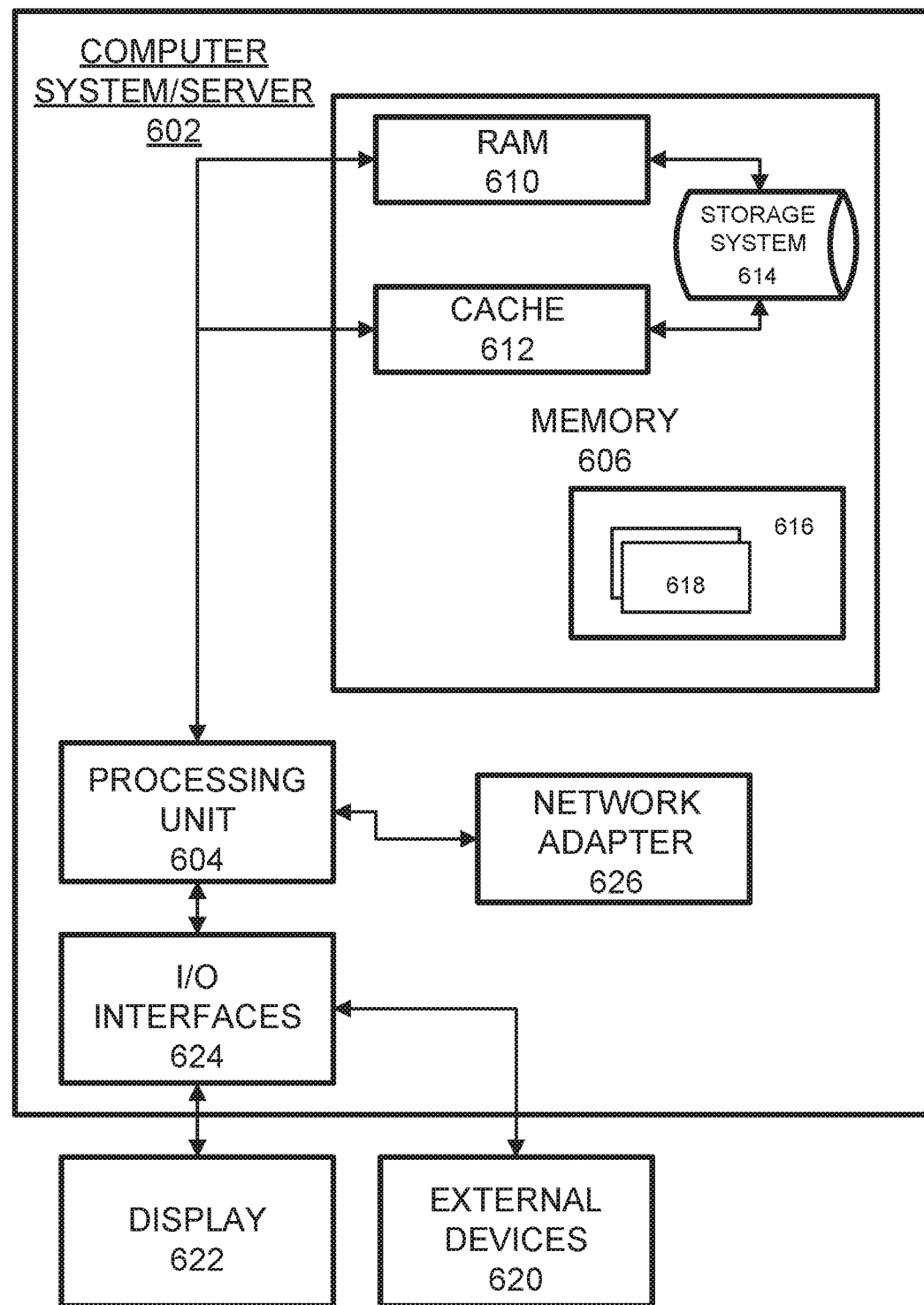
FIG. 6 illustrates an example computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

What is claimed is:

1. A method, comprising:
   monitoring, by an adaptive traffic engine, transaction data of a blockchain;
   detecting, by the adaptive traffic engine, a transaction commit event time out in the blockchain;
   determining, by the adaptive traffic engine, a processing queue of the blockchain;
   measuring, by the adaptive traffic engine, a sending rate of the blockchain; and
   adjusting the sending rate, by the adaptive traffic engine, based on the transaction commit event time out, the processing queue and the sending rate to optimize performance of the blockchain.

2. The method of claim 1, wherein the adjusting comprises decreasing the sending rate of the blockchain.

3. The method of claim 2, wherein the decreasing of the sending rate is performed in response to one of:
   the processing queue exceeding a high threshold; and
   the processing queue exceeding a pre-defined level of a queue depth; and
   the sending rate exceeding a drain rate.

4. The method of claim 1, wherein the adjusting comprises increasing the sending rate of the blockchain.

5. The method of claim 4, wherein the increasing of the sending rate is performed in response to one of:
   the processing queue being below a pre-defined level of a queue depth;
   the processing queue being below a low threshold; and
   the sending rate being below a drain rate.

6. The method of claim 1, further comprising continuous self-adjusting of the blockchain sending rate based on a state and a history of the blockchain until the blockchain reaches a steady state with a maximum number of transactions per second.

7. The method in claim 1, further comprising optimizing of the performance of the blockchain to align with a blockchain service level agreement (SLA).

8. A system, comprising:
   a processor;
   a memory on which are stored machine readable instructions that when executed by the processor, cause the processor to:
   monitor transaction data of a blockchain;
   detect a transaction commit event time out in the blockchain;
   determine a processing queue of the blockchain;
   measure a sending rate of the blockchain; and
   adjust the sending rate based on the transaction commit event time out, the processing queue and the sending rate to optimize performance of the blockchain.

9. The system of claim 8, wherein the instructions cause the processor to decrease the sending rate of the blockchain.

10. The system of claim 9, wherein the instructions cause the processor to decrease the sending rate of the blockchain in response to one of:
    the processing queue exceeding a high threshold;
    the processing queue exceeding a pre-defined level of a queue depth; and
    the sending rate exceeding a drain rate.

11. The system of claim 8, wherein the instructions cause the processor to increase the sending rate of the blockchain.

12. The system of claim 11, wherein the instructions cause the processor to increase the sending rate of the blockchain in response to one of:
- the processing queue being below a pre-defined level of a queue depth;
- the processing queue being below a low threshold; and
- the sending rate being below a drain rate.

13. The system of claim 8, wherein the instructions further cause the processor to continuously self-adjust the blockchain sending rate based on a state and a history of the blockchain until the blockchain reaches a steady state with a maximum number of transactions per second.

14. The system of claim 8, wherein the instructions are further to cause the processor to optimize the performance of the blockchain to align with a blockchain service level agreement (SLA).

15. A non-transitory computer readable medium comprising instructions, that when read by a processor, cause the processor to perform:
- monitoring transaction data of a blockchain;
- detecting a transaction commit event time out in the blockchain;
- determining a processing queue of the blockchain;
- measuring a sending rate of the blockchain; and
- adjusting the sending rate based on the transaction commit event time out, the processing queue and the sending rate to optimize performance of the blockchain.

16. The non-transitory computer readable medium of claim 15, wherein the adjusting comprises decreasing the sending rate of the blockchain.

17. The non-transitory computer readable medium of claim 16, wherein the decreasing of the sending rate of the blockchain is performed in response to one of:
- the processing queue exceeding a high threshold;
- the processing queue exceeding a pre-defined level of a queue depth; and
- the sending rate exceeding a drain rate.

18. The non-transitory computer readable medium of claim 15, wherein the adjusting comprises increasing the sending rate of the blockchain.

19. The non-transitory computer readable medium of claim 18, wherein the increasing of the sending rate of the blockchain is performed in response to one of:
- the processing queue being below a pre-defined level of a queue depth;
- the processing queue being below a low threshold; and
- the sending rate being below a drain rate.

20. The non-transitory computer readable medium of claim 15, further comprising instructions, that when read by the processor, cause the processor to optimize the performance of the blockchain to align with a blockchain service level agreement (SLA).

* * * * *